United States Patent
Arbab et al.

(10) Patent No.: US 7,071,133 B2
(45) Date of Patent: Jul. 4, 2006

(54) COLORED GLASS COMPOSITIONS AND-AUTOMOTIVE VISION PANELS WITH-REDUCED TRANSMITTED-COLOR SHIFT

(75) Inventors: Mehran Arbab, Allison Park, PA (US); Dennis G. Smith, Butler, PA (US); Larry J. Shelestak, Bairdford, PA (US); Mary T. Strzelecki, Laslin, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 397 days.

(21) Appl. No.: 10/373,080

(22) Filed: Feb. 21, 2003

(65) Prior Publication Data

US 2003/0216242 A1 Nov. 20, 2003

Related U.S. Application Data

(63) Continuation-in-part of application No. 09/591,573, filed on Jun. 9, 2000, now abandoned, which is a continuation-in-part of application No. 08/414,165, filed on Mar. 31, 1995, now Pat. No. 6,114,264, which is a continuation of application No. 08/153,246, filed on Nov. 16, 1993, now abandoned.

(60) Provisional application No. 60/144,552, filed on Jul. 16, 1999, and provisional application No. 60/138,899, filed on Jun. 11, 1999.

(51) Int. Cl.
*C03C 3/087* (2006.01)

(52) U.S. Cl. .......................................... 501/70; 501/71

(58) Field of Classification Search .................. 501/70, 501/71
See application file for complete search history.

(56) References Cited

U.S. PATENT DOCUMENTS

| | | | |
|---|---|---|---|
| 2,524,719 A | 10/1950 | Tillyer | 106/52 |
| 2,688,565 A | 9/1954 | Raymond | 117/35 |
| 2,724,658 A | 11/1955 | Lytle | 117/54 |
| 2,860,059 A | 11/1958 | Molter et al. | 106/52 |
| 2,892,726 A | 6/1959 | Smith et al. | 106/52 |
| 2,901,366 A | 8/1959 | Smith et al. | 106/52 |
| 2,938,808 A | 5/1960 | Duncan et al. | 106/52 |
| RE25,312 E | 1/1963 | Duncan et al. | 106/52 |
| 3,081,200 A | 3/1963 | Tompkins | 117/213 |
| 3,107,177 A | 10/1963 | Saunders et al. | 117/211 |
| 3,143,683 A | 8/1964 | Duncan et al. | 501/71 X |
| 3,294,556 A | 12/1966 | Harrington | 106/52 |
| 3,294,561 A | 12/1966 | Duncan et al. | 106/54 |
| 3,296,004 A | 1/1967 | Duncan | 106/52 |
| 3,300,323 A | 1/1967 | Plumat et al. | 106/52 |
| 3,410,710 A | 11/1968 | Mochel | 117/33.3 |
| 3,411,934 A | 11/1968 | Englehart et al. | 117/33.3 |
| 3,498,806 A | 3/1970 | Hammer et al. | 106/52 |

(Continued)

FOREIGN PATENT DOCUMENTS

EP 0 561 337 9/1993

(Continued)

*Primary Examiner*—Karl Group
(74) *Attorney, Agent, or Firm*—Jacques B. Miles

(57) ABSTRACT

A neutral gray colored glass composition for automotive vision panels having reduced transmitted color shift characteristics is provided. The glass composition has a base portion including 65 to 75 weight percent $SiO_2$, 10 to 20 weight percent $Na_2O$, 5 to 15 weight percent CaO, 0 to 5 weight percent MgO, 0 to 5 weight percent $Al_2O_3$, and 0 to 5 weight percent $K_2O$. The composition also includes major colorants including 0.30 to 0.75 weight percent $Fe_2O_3$, 0 to 15 ppm CoO, and 1 to 15 ppm Se. The glass has a luminous transmittance of at least 65 percent at a thickness of 3.9 mm, a redox ratio of 0.2 to 0.675, a TSET of less than or equal to 65 percent, and a standard color shift of less than 6.

28 Claims, 1 Drawing Sheet

U.S. PATENT DOCUMENTS

| | | | |
|---|---|---|---|
| 3,628,932 A | 12/1971 | Inoue et al. ............... | 65/18 |
| 3,660,061 A | 5/1972 | Donley et al. ............. | 65/32 |
| 3,723,142 A | 3/1973 | Kato et al. ................. | 106/52 |
| 3,967,040 A | 6/1976 | Plumat et al. .............. | 428/410 |
| 4,101,705 A | 7/1978 | Fischer et al. ............. | 428/220 |
| 4,104,076 A | 8/1978 | Pons .......................... | 106/52 |
| 4,111,150 A | 9/1978 | Donley et al. ............. | 118/7 |
| 4,129,434 A | 12/1978 | Plumat et al. .............. | 65/60 |
| 4,134,240 A | 1/1979 | Bologna et al. ............ | 52/202 |
| 4,190,452 A | 2/1980 | Fischer et al. ............. | 106/52 |
| 4,294,881 A | 10/1981 | Meyer et al. ............... | 428/334 |
| 4,308,319 A | 12/1981 | Michelotti et al. ......... | 428/432 |
| 4,336,303 A | 6/1982 | Rittler ........................ | 428/334 |
| 4,339,541 A | 7/1982 | Dela Ruye .................. | 501/71 |
| 4,379,040 A | 4/1983 | Gillery ........................ | 204/192 P |
| 4,381,934 A | 5/1983 | Kunkle et al. ............... | 65/135 |
| 4,466,562 A | 8/1984 | DeTorre ...................... | 225/2 |
| 4,521,454 A | 6/1985 | Kandachi et al. ........... | 427/168 |
| 4,610,771 A | 9/1986 | Gillery ........................ | 204/192 C |
| 4,617,206 A | 10/1986 | Haisma et al. .............. | 427/374.1 |
| 4,671,155 A | 6/1987 | Goldinger .................... | 83/886 |
| 4,719,126 A | 1/1988 | Henery ........................ | 427/165 |
| 4,719,127 A | 1/1988 | Greenberg ................... | 427/165 |
| 4,728,353 A | 3/1988 | Thomas et al. .............. | 65/60.1 |
| 4,792,536 A | 12/1988 | Pecoraro et al. ............. | 501/70 |
| 4,798,616 A | 1/1989 | Knavish et al. ............. | 65/135 |
| 4,853,257 A | 8/1989 | Henery ........................ | 427/166 |
| 4,861,669 A | 8/1989 | Gillery ........................ | 428/434 |
| 4,866,010 A | 9/1989 | Boulos et al. ............... | 501/71 |
| 4,873,206 A | 10/1989 | Jones .......................... | 501/71 |
| 4,886,539 A | 12/1989 | Gerutti et al. ............... | 65/135 |
| 4,900,633 A | 2/1990 | Gillery ........................ | 428/432 |
| 4,920,006 A | 4/1990 | Gillery ........................ | 428/432 |
| 4,938,857 A | 7/1990 | Gillery ........................ | 204/192.27 |
| 4,971,843 A | 11/1990 | Michelotti et al. .......... | 428/34 |
| 5,023,210 A | 6/1991 | Krumwiede et al. ........ | 501/71 |
| 5,030,593 A | 7/1991 | Heithoff ...................... | 501/72 |
| 5,070,048 A | 12/1991 | Boulos et al. ............... | 501/71 |
| 5,071,796 A | 12/1991 | Jones et al. .................. | 501/70 |
| 5,256,607 A | 10/1993 | Kerko et al. ................. | 501/65 |
| 5,264,400 A | 11/1993 | Nakaguchi et al. .......... | 501/71 |
| 5,278,108 A | 1/1994 | Cheng et al. ................. | 501/71 |
| 5,308,805 A | 5/1994 | Baker et al. ................. | 501/71 |
| RE34,639 E | 6/1994 | Boulos et al. ............... | 501/71 |
| 5,318,931 A | 6/1994 | Nakaguchi et al. .......... | 501/64 |
| 5,352,640 A | 10/1994 | Combes et al. .............. | 501/71 |
| 5,364,820 A | 11/1994 | Morimoto et al. ........... | 501/71 |
| 5,380,685 A * | 1/1995 | Morimoto et al. ........... | 501/71 |
| 5,464,657 A | 11/1995 | Athey et al. ................. | 427/255.5 |
| 5,478,783 A | 12/1995 | Higby et al. ................. | 501/71 |
| 5,536,718 A | 7/1996 | Albright et al. ............. | 514/220 |
| 5,552,180 A | 9/1996 | Finley et al. ................ | 427/165 |
| 5,582,455 A | 12/1996 | Casariego et al. ........ | 296/146.2 |
| 5,599,387 A | 2/1997 | Neuman et al. ........ | 106/287.14 |
| 5,776,846 A * | 7/1998 | Sakaguchi et al. ........... | 501/70 |
| 5,821,001 A | 10/1998 | Arbab et al. ................. | 428/623 |
| 5,830,252 A | 11/1998 | Finley et al. ................ | 65/60.5 |
| 5,837,629 A | 11/1998 | Combes et al. .............. | 501/70 |
| 5,877,103 A * | 3/1999 | Dupont et al. ............... | 501/71 |
| 5,958,811 A * | 9/1999 | Sakaguchi et al. ........... | 501/71 |
| 6,114,264 A * | 9/2000 | Krumwiede et al. ........ | 501/70 |
| 6,326,324 B1 | 12/2001 | Sakaguchi et al. ........... | 501/64 |

FOREIGN PATENT DOCUMENTS

| | | |
|---|---|---|
| EP | 0 653 386 | 5/1995 |
| EP | 0 834 481 | 4/1998 |
| EP | 0 854 118 | 7/1998 |
| JP | 6-345482 | 12/1994 |
| JP | 9-169541 | 6/1997 |

* cited by examiner

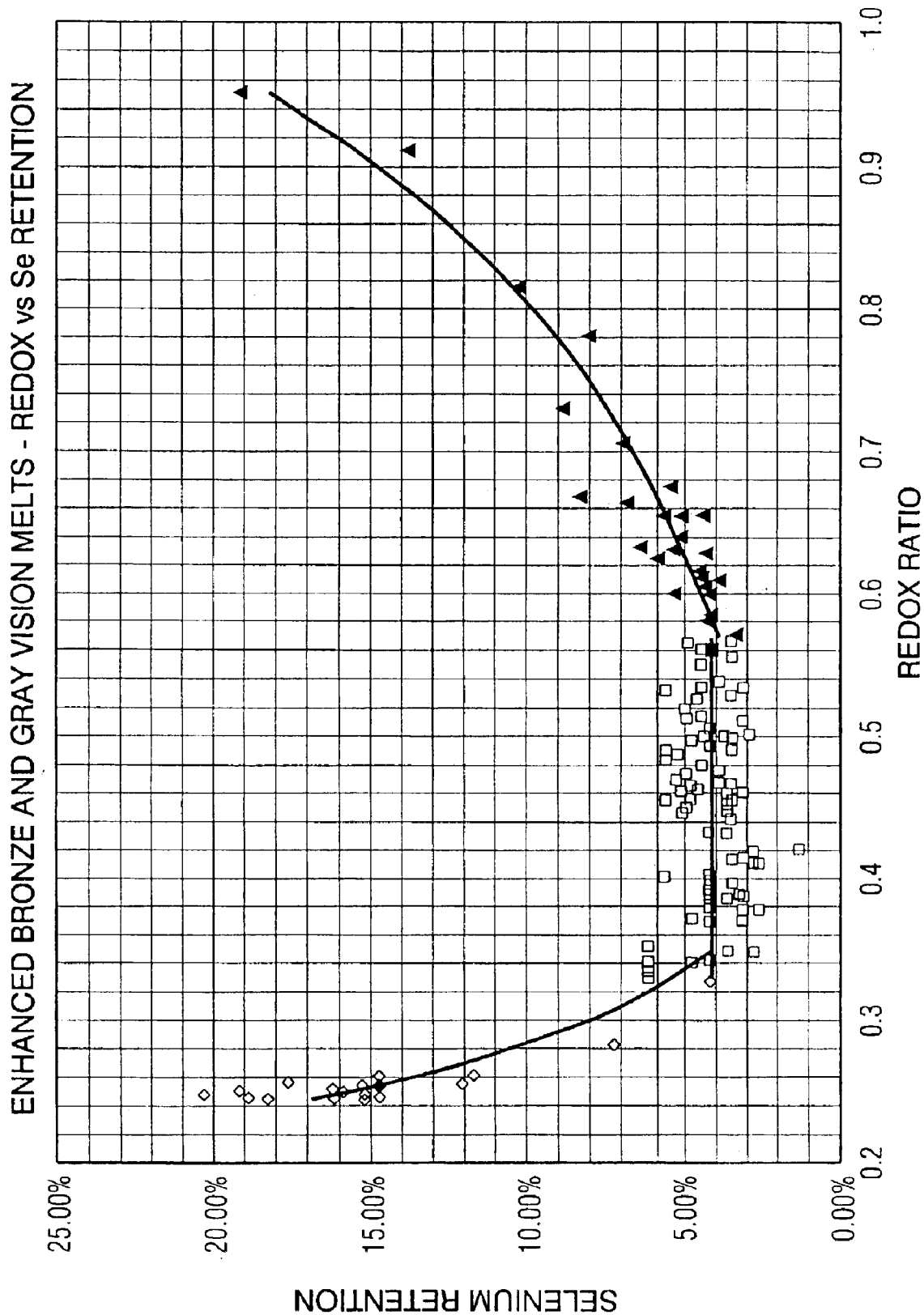

COLORED GLASS COMPOSITIONS AND-AUTOMOTIVE VISION PANELS WITH-REDUCED TRANSMITTED-COLOR SHIFT

CROSS-REFERENCE TO RELATED APPLICATIONS

This application is a continuation in part application of U.S. patent application Ser. No. 09/591,573 filed Jun. 9, 2000, now abandoned, which was a continuation-in-part of U.S. patent application Ser. No. 08/414,165 filed Mar. 31, 1995, now U.S. Pat. No. 6,114,264, which was a continuation of U.S. patent application Ser. No. 08/153,246 filed Nov. 16, 1993, now abandoned; this application also claims the benefits of U.S. Provisional Application Nos. 60/138,899 filed Jun. 11, 1999, and 60/144,552 filed Jul. 16, 1999, all of which applications are herein incorporated by reference.

BACKGROUND OF THE INVENTION

1. Field of the Invention

This invention relates generally to neutral colored glass compositions and, more particularly, to gray colored glass compositions having low transmitted color shift characteristics which are particularly well suited for automotive vision panels, such as windshields and front sidelights.

2. Technical Considerations

In different parts of the world, governmental agencies with responsibility for regulating or licensing motor vehicle safety or use of highways or other public thoroughfares have prescribed minimum luminous light transmittance values for particular automotive "vision panels", such as windshields and front sidelights. For instance, United States Federal regulations require the luminous light transmittance (LTA) of automotive windshields and front sidelights to be at least 70%. The luminous transmittance requirements for other automotive transparencies, such as back sidelights and rear lights of trucks and minivans, and for non-vision panels, such as sun roofs, moon roofs and the like, are typically less than those for windshields and front sidelights. Other areas of the world may have a different prescribed minimum.

Colored or coated automotive transparencies in use today which meet the mandated luminous transmission requirements may also provide some degree of shading or solar control properties, for example, to help decrease the detrimental effects of ultraviolet radiation on the interior of the vehicle, e.g., fabric fading. However, while these known automotive transparencies may provide some degree of solar energy protection, they also tend to have an effect on the perceived color of an object viewed through the transparency. For example, the color of a vehicle interior, e.g., the interior fabric color, perceived from outside the vehicle seen through a conventional colored automotive transparency may appear to be of a different color than the actual color of the interior. If the vehicle interior has been selected to provide a certain aesthetic effect with respect to the overall appearance of the vehicle, this perceived or "transmitted color shift" may adversely impact upon the overall aesthetic appearance of the vehicle.

Therefore, a neutral colored glass, e.g., a glass having a lower excitation purity or a less intense color, such as gray, which reduces this perceived color shift while also providing good solar performance properties would be advantageous. However, forming such a glass poses various production concerns. For example, most colored automotive glass compositions having good solar control properties, such as infrared ("IR") or ultraviolet ("UV") absorption and/or reflection, also have a moderate to high concentration of ferrous iron (FeO). Ferrous iron produces a broad absorption band in the red to near IR region of the solar spectrum. The concentration of ferrous iron in glass depends on both the total concentration of iron oxide and the oxidation state of glass, or its redox ratio. Therefore, achieving moderate to higher levels of ferrous iron in glass can involve increasing either the total iron concentration of the glass or the glass redox ratio, or both.

At a commonly practiced redox ratio of 0.35 or less, increasing total iron in the glass generally results in green colors. On the other hand, increasing the glass redox ratio shifts the glass color to blue. Increasing either or both of these variables also can result in lower luminous light transmittance (LTA) due to higher absorption of visible light. Thus, to achieve high IR absorption in a neutral colored glass while maintaining a high level of visible transmittance to meet mandated minimum LTA regulations is particularly difficult.

Therefore, it is an object of the present invention to provide glass compositions and automotive vision panels which are neutral in color, which provide good solar performance properties, and which also provide lower transmitted color shift characteristics than conventional glass compositions. The glass compositions of the invention can be produced over a wide range of redox ratios.

SUMMARY OF THE INVENTION

The present invention provides glass compositions having a neutral gray color and luminous (visible) transmittance within a range that allows the glass to be used in the forward vision areas of motor vehicles, e.g., windshield and front sidelights, or as primary glazing in a vehicle. The glass may also be useful for use in architectural transparencies. The glass of the present invention may have a typical soda-lime-silica glass base portion, such as that for conventional float or flat glass, with major colorants which also provide some solar control properties. The major colorants comprise 0.30 to 0.75 weight percent total iron ($Fe_2O_3$), 0 to 15 ppm CoO, and 1 to 15 ppm Se, with a redox ratio of 0.2 to 0.675. The glass preferably has a luminous transmittance of at least 65% at a thickness of 3.9 mm and a total solar energy transmission (TSET) of less than or equal to 65%. As discussed in detail in Example 2, the glass also preferably provides a standard transmitted color shift of less than about 6, more preferably less than about 5.

The dominant wavelength of the glass may vary somewhat in accordance with particular color preferences. However, it is preferred that the glass be a neutral gray color characterized by dominant wavelengths in the range of around 480 nm to around 580 nm, with an excitation purity of less than around 8%.

The glass of the present invention may be produced using either high redox methods, e.g., redox ratios greater than or equal to 0.35, preferably greater than or equal to 0.4, or low redox methods, e.g., redox ratios less than 0.35, preferably less than 0.3. The high redox methods are currently preferred for providing maximum performance and best color, i.e., most neutral color. The redox range of this invention is achievable on conventional overhead fired and other glass melting furnaces. As will be appreciated by those skilled in the art, input adjustments to the batch components that control the redox ratio, i.e., oxidizing salts, such as salt cake and gypsum, and reducing agents, such as carbon, may be required to obtain redox ratios of greater than about 0.25.

The present invention also provides a method of producing glass in which selenium loss is stabilized. By "stabilized" it is meant that the fraction of selenium retained in the glass remains substantially constant or even increases over a given range of redox ratios. In the present invention, it has been discovered that for selenium containing bronze and/or gray glass batch compositions, the percent of selenium retention in the glass becomes relatively constant over a redox ratio range of about 0.35 to about 0.60. Moreover, increasing the redox ratio above 0.60 results in increasing levels of selenium retention.

Thus, the glass manufactured according to the processes and compositions described herein can have a neutral gray appearance, a low TSET value and a low standard transmitted color shift. Also, by adding various amounts and combinations of additional components, such as cerium oxide, vanadium oxide, molybdenum oxide, titanium oxide, zinc oxide, and tin oxide to the above glass compositions, the UV transmission of the article may be suppressed as well.

BRIEF DESCRIPTION OF THE DRAWING

FIG. 1 is a graph of percent selenium retention versus redox ratio for a number of bronze or gray glass batch melts.

DETAILED DESCRIPTION OF THE INVENTION

Unless otherwise indicated, all numbers expressing quantities of ingredients, reaction conditions, dimensions, physical characteristics, processing parameters, and the like, used in the specification and claims are to be understood as being modified in all instances by the term "about". For example, for gross units by "about" it is meant plus or minus (+/−) 50%, preferably +/−40%, more preferably +/−25%, even more preferably +/−10%, still more preferably +/−5%, and most preferably is the reported value or a value in the stated range. Additionally, any numeric reference to amounts, unless otherwise specified, is "by weight percent". As used herein, spatial or directional terms, such as "left", "right", "inner", "outer", "above", "below", "top", "bottom", and the like, relate to the invention as it is shown in the drawing figures. However, it is to be understood that the invention may assume various alternative orientations and, accordingly, such terms are not to be considered as limiting. Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10. The terms "flat" or "substantially flat" substrate refer to a substrate that is substantially planar in form; that is, a substrate lying primarily in a single geometric plane, which substrate, as would be understood by one skilled in the art, can include slight bends, projections, or depressions therein. Further, as used herein, the terms "deposited over", "applied over", or "provided over" mean deposited or provided on but not necessarily in surface contact with the surface. For example, a coating "deposited over" a substrate does not preclude the presence of one or more other coating films of the same or different composition located between the deposited coating and the substrate. Any mentioning of a U.S. Patent or patent document or literature reference in the following description also incorporates by reference that document herein and is to be understood to be incorporated in its entirety.

The total iron content of the glass compositions disclosed herein is expressed in terms of $Fe_2O_3$ in accordance with standard analytical practice, regardless of the form actually present. Likewise, the amount of iron in the ferrous state is reported as FeO, even though it may not actually be present in the glass as FeO. Furthermore, unless stated otherwise, the term "total iron" in this specification shall mean total iron expressed in terms of $Fe_2O_3$ and the term "FeO" shall mean iron in the ferrous state expressed in terms of FeO. As used herein, the term "redox ratio" means the amount of iron in the ferrous state (expressed as FeO) divided by the amount of total iron (expressed as $Fe_2O_3$). Selenium is expressed in terms of elemental Se and cobalt is expressed in terms of CoO. As used herein, the terms "solar control" and "solar control properties" mean properties which affect the solar properties, e.g., visible, IR or UV transmittance and/or reflectance of the glass.

Generally, the glass compositions of the present invention have a base portion, i.e., the major constituents of the glass without the major colorants, comprising a soda-lime-silica type glass characterized as follows (all values are in weight percent):

| | |
|---|---|
| $SiO_2$ | 65–75 |
| $Na_2O$ | 10–20 |
| CaO | 5–15 |
| MgO | 0–5 |
| $Al_2O_3$ | 0–5 |
| $K_2O$ | 0–5 |

Major colorants, such as iron, cobalt, and/or selenium, may be added to this base portion to color the glass and/or provide the glass with solar control properties, such as IR and/or UV radiation absorbing characteristics. In a currently preferred embodiment, the major colorants comprise: 0.30 to 0.75 weight percent total iron, 0 to 15 ppm CoO, and 1 to 15 ppm Se, with a redox ratio of 0.2 to 0.675.

The glass compositions of the invention can be produced over a wide range of redox ratios. For example, for a redox ratio of less than about 0.4, preferably 0.2 to 0.4, more for example about 0.26 and even 0.265 to 0.35, one exemplary glass composition of the invention can comprise greater than 0.5 up to 0.75 for instance 0.72 weight percent total iron, less than 12 ppm CoO, for example less than 9 ppm CoO a suitable example of which is up to 7 ppm CoO, and less than 9 ppm Se, suitably 1 to 6 ppm Se a nonexclusive example of which is up to 4 ppm Se. For a redox ratio greater than or equal to 0.4, preferably 0.4 to 0.675, an exemplary glass composition of the invention can comprise less than 0.5 weight percent total iron, preferably 0.3 to 0.5 weight percent total iron, and 3 to 6 ppm Se, preferably 4 to 5 ppm Se, with little, if any, CoO. Specific glass compositions and their influence on transmitted color shift are described in the Examples below.

The glass compositions of the invention provide neutral colored, i.e., gray, glass. The color of an object, and in particular glass, is highly subjective. Observed color will depend on the lighting conditions and the preferences of the observer. In order to evaluate color on a quantitative basis, several color order systems have been developed. One such method of specifying color adopted by the International Commission on Illumination (CIE) uses dominant wavelength (DW) and excitation purity (Pe). The numerical values of these two specifications for a given color can be determined by calculating the color coordinates x and y from the so-called tristimulus values X, Y, Z of that color. The color coordinates are then plotted on a 1931 CIE chromaticity diagram and numerically compared with the coordinates of CIE standard illuminant C, as identified in CIE publication No. 15.2, herein incorporated by reference. This comparison provides a color space position on the diagram to ascertain the excitation purity and dominant wavelength of the glass color.

In another color order system, the color is specified in terms of hue and lightness. This system is commonly referred to as the CIELAB color system. Hue distinguishes colors such as red, yellow, green and blue. Lightness, or value, distinguishes the degree of lightness or darkness. The numerical values of these characteristics, which are identified as L*, a* and b*, are calculated from the tristimulus values (X, Y, Z). L* indicates the lightness or darkness of the color and represents the lightness plane on which the color resides. a* indicates the position of the color on a red (+a*) green (−a*) axis. b* indicates the color position on a yellow (+b*) blue (−b*) axis. When the rectangular coordinates of the CIELAB system are converted into cylindrical polar coordinates, the resulting color system is known as the CIELCH color system which specifies color in terms of lightness (L*), and hue angle (H°) and chroma (C*). L* indicates the lightness or darkness of the color as in the CIELAB system. Chroma, or saturation or intensity, distinguishes color intensity or clarity (i.e. vividness vs. dullness) and is the vector distance from the center of the color space to the measured color. The lower the chroma of the color, i.e. the less its intensity, the closer the color is to being a so-called neutral color. With respect to the CIELAB system, $C^* = (a^{*2} + b^{*2})^{1/2}$. Hue angle distinguishes colors such as red, yellow, green and blue and is a measure of the angle of the vector extending from the a*, b* coordinates through the center of the CIELCH color space measured counterclockwise from the red (+a*) axis.

It should be appreciated that color may be characterized in any of these color systems and one skilled in the art may calculate equivalent DW and Pe values; L*, a*, b* values; and L*, C*, H° values from the transmittance curves of the viewed glass or composite transparency. A detailed discussion of color calculations is given in U.S. Pat. No. 5,792,559.

Additional colorants may also be added to the basic iron containing soda-lime-silica glass composition of the invention described above to reduce the color intensity in the glass, and in particular to produce a neutral gray glass. As used herein, the term "gray" means a glass or transparency having dominant wavelengths in the range of 480 nm to 580 nm, for example 485 nm to 540 nm, with an excitation purity of less than around 8%, preferably less than 3%.

To avoid the formation of nickel sulfide stones, the currently preferred glass composition of the invention is preferably essentially nickel free; that is, no deliberate addition of nickel or nickel compounds is made, although the possibility of traces of nickel due to contamination may not always be avoided. Although not preferred, other embodiments of the invention could include nickel.

It should be appreciated that the glass compositions disclosed herein may include small amounts of other materials, for example, melting and refining aids, tramp materials or impurities. It should be further appreciated that small amounts of additional components may be included in the glass to provide desired color characteristics and/or improve the solar performance of the glass. Examples of such components include iron polysulfide. Further examples include chromium, manganese, titanium, cerium, zinc, molybdenum, or oxides or combinations thereof. If present, these additional components preferably comprise less than or equal to about 3 weight percent of the glass composition.

As discussed above, the major colorants of the invention, some of which provide solar performance properties to the glass, include iron oxide, selenium, and in some embodiments cobalt oxide. The iron oxides in the glass composition perform several functions. Ferric oxide, $Fe_2O_3$, is a strong ultraviolet radiation absorber and operates as a yellow colorant in the glass. Ferrous oxide, FeO, is a strong infrared radiation absorber and operates as a blue colorant.

Selenium (Se) is an element that, depending on its oxidation state, acts as an ultraviolet absorbing material and/or as a colorant material. Selenium as colorant gives different results for color depending on its oxidation state. Oxidized as selenite or selenate, there is no visible effect (no impact) on color. Elemental selenium (dissolved as molecular Se) gives the glass a pink color. Reduced selenium (ferric selenide) gives the glass a reddish-brown color. Se may also absorb some infrared radiation and its use tends to reduce redox.

Cobalt oxide (CoO) operates as a blue colorant and does not exhibit any appreciable infrared or ultraviolet radiation absorbing properties. A proper balance between the iron, i.e. ferric and ferrous oxides, selenium, and in most embodiments cobalt is required to obtain the desired colored vision glass with the desired spectral properties.

There will be limits on the concentration of selenium and cobalt if the product is intended for an automotive vision glass application with LTA greater than about 70%. Specific examples are provided herein. To reduce the thermal load into a vehicle, the product should have a total solar energy transmittance (TSET) of less than or equal to 65%, more preferably less than or equal to 60%, even more preferably less than or equal to 55%, and most preferably less than or equal to 50%. To maintain the required LTA and desired TSET, the concentrations of Se, CoO, total $Fe_2O_3$, and redox ratio should be controlled. Thus, the provided examples give specific combinations of the above variables for desired color and TSET values. However, it is to be understood that the invention is not limited to the Examples disclosed herein. Generally, for the preferred combination of properties, as the TSET of glass is reduced, the FeO concentration (=Redox ratio ×total $Fe_2O_3$ concentration) increases. Beyond a certain value of total $Fe_2O_3$, redox ratio, or combinations thereof, it will become necessary to reduce the concentration of CoO, Se, or both.

An exemplary high redox glass composition of the present invention has the following constituents:

| | |
|---|---|
| $SiO_2$ | 65–75 weight percent |
| $Na_2O$ | 10–20 weight percent |
| CaO | 5–15 weight percent |
| MgO | 0–5 weight percent |
| $Al_2O_3$ | 0–5 weight percent |
| $K_2O$ | 0–5 weight percent |
| $Fe_2O_3$ | 0.25–0.5 weight percent |

-continued

| | |
|---|---|
| CoO | 0–12 ppm |
| Se | 3–12 ppm |
| Redox Ratio | 0.4–0.60 |

For glasses with LTA less than about 70%, a broader range of the above colorants and redox ratio may be used. The maximum amounts of CoO and Se will be in the lower end of the above range for lower TSET values, e.g., less than or equal to about 52%. In addition, for a given LTA and TSET, the sum of their individual compositions will be less than the maximum usable concentration for each colorant alone. As a general rule, as the TSET value decreases, less of the above colorants will be required.

In one embodiment of the present invention, the major colorants for the glass are essentially free of lanthanum oxide, while in another embodiment the major colorants are essentially free of cerium oxide or both lanthanum oxide and cerium oxide. This means that there is no deliberate addition of these materials so they are present in the glass. Of course, some tramp or trace amounts or impurities of these materials may be present in batch materials for the basic and colorant portions of the glass.

The glass of the present invention may be made of any thickness, where the float glass process is used the glass can have any floatable thickness a nonexclusive example of which is 1 mm to 20 mm, preferably about 1.6 mm to about 4.9 mm. As noted elsewhere in this description the solar properties of the glass are based on a reference glass thickness of 0.1535 inch (3.9 mm). For thinner glass the amounts of the colorants may be higher in the ranges given or above these ranges as long as the colored glass has the desired color, luminous, and solar characteristics as the glass at the reference thickness.

With respect to the high redox ratio embodiments of the invention, a major anticipated problem was the combination of high redox and selenium in glass. Selenium added in batch materials for glass production rapidly volatilizes at elevated temperatures before it is incorporated in the glass melt, thereby lowering its retention in the resultant glass. It is commonly believed in the glass industry that increasing the redox ratio will result in even less selenium retention. Early data had indicated that in the lower end of the redox ratio range of the invention, e.g., 0.2–0.3, as the redox ratio is increased, selenium retention decreases rapidly. By extension, at redox ratio values greater than 0.3, one would expect negligible selenium retention in glass. As shown in FIG. 1, the present invention has confirmed the rapid decrease in selenium retention as the redox ratio is increased from about 0.2 to about 0.35. FIG. 1 shows the weight percent retention of selenium in various bronze or gray glass batch compositions made at different redox ratios. However, as also shown in FIG. 1, it has also been surprisingly discovered that this trend of decreased selenium retention slows down and selenium retention becomes relatively independent of the redox ratio, i.e., levels off to a substantially constant final percent retention, for compositions in the range of redox ratio values from about 0.35 to about 0.60. Moreover, increasing the redox ratio beyond about 0.60 actually results in increasing levels of selenium retention. Thus, when producing bronze or gray glass in the redox ratio range of 0.35 to 0.60, the starting amount of selenium does not have to be increased as the redox ratio is increased to arrive at substantially the same final amount of selenium in the glass, contrary to what would have been previously expected.

The glass compositions of the present invention may be produced from melting and refining batch material known to those skilled in the art in a continuous, large-scale, commercial glass melting operation. The glass compositions can be formed into flat glass sheets of varying thickness by the float process in which the molten glass is supported on a pool of molten metal, usually tin, as it assumes a ribbon shape and is cooled, in a manner well known in the art.

Although it is preferred that the glass disclosed herein be made using a conventional, overhead fired continuous melting operation as is well known in the art, the glass may also be produced using a multi-stage melting operation, for example, as disclosed in U.S. Pat. No. 4,381,934 to Kunkle, et al., U.S. Pat. No. 4,792,536 to Pecoraro, et al. and U.S. Pat. No. 4,886,539 to Cerutti, et al. If required, a stirring arrangement may be employed within the melting and/or forming stages of the glass production operation to homogenize the glass in order to produce glass of the highest optical quality.

Depending on the type of melting operation, sulfur may be added to the batch materials of a soda-lime-silica glass as a melting and refining aid. Commercially produced float glass may include up to about 0.5 wt. % $SO_3$. In a glass composition that includes iron and sulfur, providing reducing conditions may create amber coloration in some part of the glass which lowers luminous transmittance as discussed in U.S. Pat. No. 4,792,536 to Pecoraro, et al. Increasing the FeO content enables the absorption of glass in the infrared to be increased and the TSET to be reduced. However, when glass is manufactured in the presence of sulfur in highly reducing conditions, it may take on an amber color due to the formation of chromophores resulting from the reaction between sulfur and ferric iron. However, it is further believed that the reducing conditions required to produce this coloration in float glass compositions of the type disclosed herein for low redox systems are limited to approximately the first 20 microns of the lower glass surface contacting the molten tin during the float forming operation, and to a lesser extent, to the exposed upper glass surface. Because of the glass' low sulfur content and the limited region of the glass in which any coloration could occur, depending on the particular soda-lime-silica glass composition, sulfur in these surfaces would not be a major colorant. In other words, the presence of the iron sulfur chromophores would not result in the dominant wavelength for the colored glass going beyond the desired range of wavelength for the desired color for low redox. Hence, these chromophores have little if any material effect on the glass color or spectral properties at low redox, i.e., below about 0.35. At high redox ratios, i.e., above about 0.35, chromophores of iron polysulfides may form in the bulk glass itself. For example, for redox ratios greater than or equal to about 0.4, up to about 10 ppm of iron polysulfides might be present.

It should be appreciated that as a result of forming the glass on molten tin as discussed above, measurable amounts of tin oxide may migrate into surface portions of the glass on the side contacting the molten tin. Typically, a piece of float glass has an $SnO_2$ concentration ranging from about 0.05 to 2 wt. % in about the first 25 microns below the surface of the glass that was in contact with the tin. Typical background levels of $SnO_2$ may be as high as 30 parts per million (PPM). It is believed that high tin concentrations in about the first 10 Angstroms of the glass surface supported by the molten tin may slightly increase the reflectivity of that glass surface; however, the overall impact on the glass properties is minimal.

The glass compositions of the present invention can be coated with one or more film forming coatings or films or can have existing film material placed on or deposited over at least a portion of the glass. The one or more coating film(s) over the substrate can be thin films such as those applied by pyrolytic application, chemical vapor deposition and sputtering techniques such as magnetron sputtered vacuum deposition (hereinafter "MSVD") or electron beam (EB) deposition. Any of the techniques that are well known to those skilled in the art can be used. For instance, thin film deposition technology such as sputtering including vacuum sputtering, thermal evaporation, E-beam, ion-assisted deposition can be used. Electron-beam evaporation techniques that have substrate sputtering techniques can be used with sputter etching, R.F. substrate bias, and reactive sputtering. The magnetron sputtering is plasma induced, molecular level momentum transfer of a target material which is deposited in a thin film to the substrate. A magnetic field is used to enhance plasma ignition, ion energy, plasma density, deposition rate and film adhesion. The DC sputtering may be used to deposit metal thin films at high rates, or oxides or nitrides with a reactive background gas. The RF (Radio Frequency) sputtering may be used to deposit metal or insulator thin films in inert or reactive atmospheres. In the MSVD method, a metal-containing cathode target can be sputtered under negative pressure in an inert or oxygen-containing and/or nitrogen-containing atmosphere to deposit a sputter coating over substrate.

U.S. Pat. Nos. 4,379,040; 4,610,771 ("U.S. Pat. No. '771"); U.S. Pat. Nos. 4,861,669; 4,900,633; 4,920,006; 4,938,857; 5,552,180; 5,821,001; and 5,830,252, describe exemplary MSVD apparatus and methods to sputter coat metal and/or metal oxide films on a substrate, including a glass substrate.

Forming coating film by CVD or spray pyrolysis methods can also be done during the manufacture of a substrate like the glass float ribbon with the glass composition of the present invention. As discussed above, a glass float ribbon is manufactured by melting glass batch materials in a furnace and delivering the refined molten glass onto a bath of molten tin. The molten glass on the bath is pulled across the tin bath as a continuous glass ribbon while it is sized and controllably cooled to form a dimensionally stable glass float ribbon. The float ribbon is removed from the tin bath and moved by conveying rolls through a lehr to anneal the float ribbon. The annealed float ribbon is then moved through cutting stations on conveyor rolls where the ribbon is cut into glass sheets of desired length and width. U.S. Pat. Nos. 4,466,562 and 4,671,155 provide a discussion of the float glass process.

Temperatures of the float ribbon on the tin bath generally range from about 1093.3° C. (2000° F.) at the delivery end of the bath to about 538° C. (1000° F.) at the exit end of the bath. The temperature of the float ribbon between the tin bath and the annealing lehr is generally in the range of about 480° C. (896° F.) to about 580° C. (1076° F.); the temperatures of the float ribbon in the annealing lehr generally range from about 204° C. (400° F.) to about 557° C. (1035° F.) peak.

The temperature range for applying the coating film may be affected by the substrate being coated. For example where the substrate is a glass float ribbon and the coating is applied to the float ribbon during manufacture of the float ribbon, the float glass may reach temperatures in excess of 1000° C. (1832° F.) The float glass ribbon is usually attenuated or sized (e.g. stretched or compressed) at temperature above 800° C. (1472° F.). If the coating is applied while the float glass before or during attenuation, the coating may crack or crinkle as the float ribbon is stretched or compressed respectively. Therefore, it would be preferred to apply the coating when the float ribbon is dimensionally stable e.g. below about 800° C. (1472° F.) for float soda lime silica glass, and the float ribbon is at a temperature to decompose the metal-containing precursor e.g. above about 400° C. (752° F.).

U.S. Pat. Nos. 4,853,257; 4,971,843; 5,536,718; 5,464,657; and 5,599,387 describe CVD coating apparatus and methods that may be used in the practice of the invention to coat the float ribbon during manufacture thereof. The CVD method can coat a moving float ribbon yet withstand the harsh environments associated with manufacturing the float ribbon. The CVD coating apparatus may be employed at several points in the float ribbon manufacturing process. For example, CVD coating apparatus may be employed as the float ribbon travels through the tin bath after it exits the tin bath, before it enters the annealing lehr, as it travels through the annealing lehr, or after it exits the annealing lehr.

As may be appreciated by those skilled in the art, several process parameters can influence the thickness of the coating over the substrate. In regards to the material or form the coating film, concentration of the metal or metal-containing precursor in the carrier gas for pyrolytic or CVD application and the rate of flow of the carrier gas can be influential. In regards to the substrate, the speed of the float ribbon (the "line speed"), the surface area of the CVD coating apparatus relative to the surface area of the float ribbon and the surface areas and temperature of the float ribbon are factors. Also the rate of flow of exhausted carrier gas through exhaust vents of the CVD coating apparatus more particularly, the ratio of exhaust rate through the exhaust vents versus the carrier gas input rate through the CVD coating unit, known as the "exhaust matching ratio" is a factor. These parameters will affect the final thickness and morphology of the coating film formed on float ribbon by the CVD process.

U.S. Pat. Nos. 4,719,126; 4,719,127; 4,111,150; and 3,660,061 describe spray pyrolysis apparatus and methods that may be used with the float ribbon manufacturing process. While the spray pyrolysis method like the CVD method is well suited for coating a moving float glass ribbon, the spray pyrolysis has more complex equipment than the CVD equipment and is usually employed between the exit end of the tin bath and the entrance end of the annealing lehr for a float glass production process.

As can be appreciated by those skilled in the art, the constituents and concentration of the pyrolytically sprayed aqueous suspension, the line speed of the float ribbon, the number of pyrolytic spray guns, the spray pressure or volume, the spray pattern, and the temperature of the float ribbon at the time of deposition are among the parameters which will affect the final thickness and morphology of the coating formed on the float ribbon by spray pyrolysis. An example of a commercial type of coating that can be used includes those disclosed in U.S. Pat. No. 4,134,240 and coatings to reduce passage of solar energy during the summer months and/or reduce radiant heat loss such are taught in U.S. Pat. Nos. 2,724,658; 3,081,200; 3,107,177; 3,410,710 and 3,660,061 and commercially available from PPG Industries, Inc., of Pittsburgh, Pa.

Exemplary glass compositions of the invention are described in the following Examples.

EXAMPLE 1

This example discloses glass compositions embodying the principles of the present invention. It is also possible to use special computer models to design glass compositions and product properties that embody the principles of the present invention.

In addition to the iron, selenium and cobalt portions of the disclosed compositions, other tramp components may be included in the melts, for example, but not to be considered as limiting, up to about 15 ppm $Cr_2O_3$, up to about 40 ppm $MnO_2$, and up to about 0.08 wt. percent $TiO_2$. It is presumed that the $Cr_2O_3$, $MnO_2$ and $TiO_2$ can enter the glass melts as part of the cullet. For glass compositions of the instant invention produced by a commercial float process as discussed above, the produced glass may include, for example, up to about 9 ppm $Cr_2O_3$ and about 0.025 wt. % $TiO_2$. The above levels of such materials are considered to be tramp levels which would not materially affect the color characteristics and spectral properties of the glass of the present invention. It is to be understood that these "tramp material" ranges are simply exemplary and are not limiting to the invention. Higher amounts of such tramp material could be present so long as they have no deleterious effects upon the desired properties of the resultant glass.

The spectral properties shown in the following Examples are based on a reference thickness of 0.1535 inches (3.9 mm). It should be appreciated that the spectral properties of the examples may be approximated at different thicknesses using the formulas disclosed in U.S. Pat. No. 4,792,536.

With respect to the transmittance data of the Examples, the luminous transmittance (LTA) is measured using C.I.E. standard illuminant "A" with a 2° observer over the wavelength range of 380 to 770 nanometers. Glass color, in terms of dominant wavelength and excitation purity (Pe), is measured using C.I.E. standard illuminant "C" with a 2° observer, following the procedures established in ASTM E308-90. The total solar ultraviolet transmittance (TSUV) is measured over the wavelength range of 300 to 400 nanometers, total solar infrared transmittance (TSIR) is measured over the wavelength range of 775 to 2125 nanometers, and total solar energy transmittance (TSET) is measured over the wavelength range of 275 to 2125 nanometers. The TSUV, TSIR and TSET transmittance data are calculated using Parry Moon air mass 2.0 direct solar irradiance data and integrated using the Trapezoidal Rule, as is known in the art. The reported composition amounts were determined by x-ray fluorescence.

The glass composition of the present invention can be produced from batch material and previously melted material (such as cullet). An illustration of this includes the following formulation:

| | |
|---|---|
| cullet | 239.7 gm |
| sand | 331.1 gm |
| soda ash | 108.3 gm |
| limestone | 28.1 gm |
| dolomite | 79.8 gm |
| salt cake | 2.3 gm |
| $Fe_2O_3$ (total iron) | as required |

-continued

| | |
|---|---|
| Se | as required |
| $Co_3O_4$ | as required |

The raw materials can be adjusted to produce a final glass weight. Reducing agents are added as required to control redox. The cullet used which can form up to approximately 30% of the melt can include up to 0.51 wt. % total iron, 0.055 wt. % $TiO_2$ and 7 PPM $Cr_2O_3$. In preparing the melts as in the examples, the ingredients can be weighed out and mixed. A portion of the raw batch material can be placed in a silica crucible and heated to 2450° F. (1343° C.). When the batch material melts down, the remaining raw materials can be added to the crucible and the crucible can be held at 2450° F. (1343° C.) for 30 minutes. The molten batch can be heated and held at temperatures of 2500° F. (1371° C.), 2550° F. (1399° C.), 2600° F. (1427° C.) for 30 minutes, 30 minutes and 1 hour, respectively. Next, the molten glass can be fritted in water, dried and reheated to 2650° F. (1454° C.) in a platinum crucible for two hours. The molten glass can be poured out of the crucible to form a slab and annealed. Samples can be cut from the slab and ground and polished for analysis.

The chemical analysis of the glass compositions (except for FeO) can be determined using a RIGAKU 3370 X-ray fluorescence spectrophotometer. The spectral characteristics of the glass can be determined on annealed samples using a Perkin-Elmer Lambda 9 UV/VIS/NIR spectrophotometer prior to tempering the glass or prolonged exposure to ultraviolet radiation, which will effect the spectral properties of the glass. The FeO content and redox can be determined either chemically or using a glass color and spectral performance computer model.

The following is the approximate basic oxides for experimental melts calculated based on the aforementioned batch:

| | |
|---|---|
| $SiO_2$ | 72.1 wt. % |
| $Na_2O$ | 13.6 wt. % |
| CaO | 8.8 wt. % |
| MgO | 3.8 wt. % |
| $Al_2O_3$ | 0.18 wt. % |
| $K_2O$ | 0.057 wt. % |

Table 1 below discloses exemplary glass compositions of the invention at differing redox ratios. Unless otherwise indicated, the listed values are in weight percent. The term "N/A" means the data was not recorded.

TABLE 1

XRF Results

| Sample | SO$_3$ | Tot. Fe | CoO | Se | Cr$_2$O$_3$ | MnO$_2$ | TiO$_2$ | ZnO | V$_2$O$_5$ | Fe(S)x* | Redox Ratio |
|---|---|---|---|---|---|---|---|---|---|---|---|
| 1 | 0.084 | 0.290 | 0 | 0.0007 | 0.0006 | 0.0022 | 0.434 | 0 | 0 | 0 | 0.448 |
| 2 | 0.090 | 0.290 | 0 | 0.0007 | 0.0006 | 0.0021 | 0.436 | 0 | 0 | 0 | 0.460 |
| 3 | 0.108 | 0.295 | 0 | 0.0008 | 0.0006 | 0.0022 | 0.026 | 0 | 0 | 0 | 0.399 |
| 4 | 0.098 | 0.290 | 0 | 0.0007 | 0.0006 | 0.0023 | 0.582 | 0 | 0 | 0 | 0.432 |
| 5 | 0.129 | 0.300 | 0 | 0.0009 | 0.0006 | 0.0022 | 0.302 | 0 | <0.0010 | 0 | 0.371 |
| 6 | 0.081 | 0.291 | 0 | 0.0007 | 0.0007 | 0.0021 | 0.427 | 0.15 | 0 | 0 | 0.452 |
| 7 | 0.051 | 0.265 | 0.0005 | 0.0004 | 0.0008 | 0.0019 | N/A | 0.021 | 0 | 0.0005 | 0.675 |
| 8 | 0.079 | 0.366 | 0 | 0.0005 | 0.0006 | 0.0021 | 0.021 | 0 | 0 | 0.00014 | 0.503 |
| 9 | 0.184 | 0.648 | 0.0006 | 0.0003 | 0.0007 | 0.0023 | 0.025 | 0 | 0 | 0 | 0.278 |
| 10 | 0.176 | 0.657 | 0.0006 | 0.0004 | 0.0008 | 0.0020 | 0.029 | 0 | 0 | 0 | 0.267 |
| 11 | 0.180 | 0.658 | 0.0005 | 0.0003 | 0.0008 | 0.0021 | 0.029 | 0 | 0 | 0 | 0.266 |
| 12 | 0.024 | 0.375 | 0 | 0.0005 | 0.0008 | N/A | N/A | 0.03 | 0 | 0.00013 | 0.509 |

*Fe(S)x values were estimated from the optical properties of the melt except for Sample 7 where it was intentionally introduced into the computer designed glass.

Table 2 discloses the spectral properties for 0.1535 inch (3.9 mm) thick glass specimens from the compositions of Table 1.

TABLE 2

Spectral Results

| Sample | LTA | Auto UV | ISO UV | TSIR | TSET | DW | PE | x | y | D65/10 L* | a* | b* |
|---|---|---|---|---|---|---|---|---|---|---|---|---|
| 1 | 71.38 | 49.73 | 31.32 | 39.52 | 53.70 | 572.34 | 6.35 | 0.3197 | 0.3304 | 87.25 | −0.71 | 6.07 |
| 2 | 70.79 | 49.26 | 30.93 | 38.67 | 52.96 | 572.67 | 6.61 | 0.3202 | 0.3308 | 36.94 | −0.60 | 6.26 |
| 3 | 71.22 | 52.54 | 33.54 | 42.72 | 55.50 | 575.15 | 6.22 | 0.3207 | 0.3289 | 87.06 | 0.42 | 5.62 |
| 4 | 70.97 | 47.55 | 29.75 | 40.69 | 53.98 | 573.57 | 7.54 | 0.3221 | 0.3324 | 86.93 | −0.36 | 7.08 |
| 5 | 71.20 | 48.71 | 30.15 | 44.50 | 56.16 | 575.61 | 7.65 | 0.3233 | 0.3316 | 86.93 | 0.57 | 6.93 |
| 6 | 72.04 | 50.36 | 32.02 | 39.11 | 53.83 | 571.04 | 5.79 | 0.3183 | 0.3297 | 87.65 | −1.09 | 5.68 |
| 7 | 71.99 | 60.63 | 47.06 | 30.43 | 49.85 | 527.46 | 1.60 | 0.3073 | 0.3243 | 88.29 | −4.31 | 2.43 |
| 8 | 71.87 | 56.96 | 37.03 | 29.87 | 49.37 | 529.77 | 1.26 | 0.3031 | 0.3225 | 33.13 | −3.06 | 1.73 |
| 9 | 71.39 | 45.44 | 25.29 | 30.15 | 49.09 | 503.36 | 1.87 | 0.3044 | 0.3220 | 88.17 | −4.87 | 1.22 |
| 10 | 70.82 | 44.05 | 24.30 | 31.06 | 49.13 | 525.90 | 1.52 | 0.3072 | 0.3240 | 87.73 | −4.25 | 2.29 |
| 11 | 70.44 | 44.19 | 24.48 | 31.17 | 49.05 | 529.42 | 1.57 | 0.3076 | 0.3240 | 87.52 | −4.05 | 2.32 |
| 12 | 71.73 | 55.58 | 35.33 | 28.08 | 48.48 | 529.72 | 1.31 | 0.3081 | 0.3227 | 88.07 | −3.15 | 1.86 |

EXAMPLE 2

This Example illustrates the effect of the glass compositions of the invention on the perceived color of an object seen through the glass and provides a method of measuring a "standard transmitted color shift" for an object viewed through a substrate.

In order to evaluate the effect of a substrate on the perceived or "transmitted" color shift of an object seen through the substrate, a mathematical routine was developed using a "standard" system, i.e., a reference substrate, a defined reference material, and a reference illuminant. The reference substrate selected was 0.1535 inch (3.9 mm) thick Starphire® glass commercially available from PPG Industries, Inc. The reference material was defined by selecting a commercially available gray fabric whose spectral properties are listed in Table 2. The reference illuminant was D65.

First, a reflected color spectrum of the selected reference fabric was measured at various wavelengths using the reference illuminant (D65) and a Lambda 9 spectrophotometer, commercially available from Perkin-Elmer Corporation. The reflected color spectrum of the fabric material can be converted to a color, i.e. chromaticity coordinates, using the method disclosed in ASTM E 308-85 for a D65 illuminant and a standard observer of CIE 1964 (10°) observer.

Next, the transmittance of the reference Starphire® glass at the same selected wavelengths was measured with the spectrophotometer. These "reference" reflectance and transmittance data are listed in Table 3.

TABLE 3

| Wavelength | STARPHIRE Glass Reference | GRAY Fabric Reference |
|---|---|---|
| 300 | 29.39 | 0.40 |
| 305 | 40.23 | 0.73 |
| 310 | 51.54 | 0.77 |
| 315 | 60.31 | 0.82 |
| 320 | 69.28 | 0.85 |
| 325 | 74.86 | 0.87 |
| 330 | 80.49 | 0.93 |
| 335 | 83.43 | 0.98 |
| 340 | 86.39 | 0.98 |
| 345 | 87.71 | 0.99 |
| 350 | 89.04 | 1.02 |
| 355 | 89.62 | 1.07 |
| 360 | 90.20 | 1.12 |
| 365 | 90.37 | 1.16 |
| 370 | 90.53 | 1.26 |
| 375 | 90.56 | 1.40 |

TABLE 3-continued

| Wavelength | STARPHIRE Glass Reference | GRAY Fabric Reference |
|---|---|---|
| 380 | 90.60 | 1.58 |
| 385 | 90.73 | 1.89 |
| 390 | 90.86 | 2.43 |
| 395 | 90.92 | 3.25 |
| 400 | 90.97 | 4.35 |
| 410 | 91.03 | 6.48 |
| 420 | 91.03 | 7.43 |
| 430 | 91.08 | 7.81 |
| 440 | 91.06 | 8.33 |
| 450 | 91.12 | 8.97 |
| 460 | 91.19 | 9.69 |
| 470 | 91.26 | 10.23 |
| 480 | 91.28 | 10.32 |
| 490 | 91.33 | 10.57 |
| 500 | 91.37 | 10.63 |
| 510 | 91.41 | 9.64 |
| 520 | 91.45 | 9.09 |
| 530 | 91.36 | 9.68 |
| 540 | 91.42 | 9.64 |
| 550 | 91.39 | 8.52 |
| 560 | 91.39 | 8.19 |
| 570 | 91.38 | 9.22 |
| 580 | 91.31 | 9.92 |
| 590 | 91.25 | 9.86 |
| 600 | 91.21 | 9.72 |
| 610 | 91.20 | 9.74 |
| 620 | 91.14 | 9.54 |
| 630 | 91.04 | 9.42 |
| 640 | 90.96 | 9.61 |
| 650 | 91.01 | 10.44 |
| 660 | 90.81 | 12.20 |
| 670 | 90.78 | 14.82 |
| 680 | 90.64 | 17.97 |
| 690 | 90.64 | 21.46 |
| 700 | 90.53 | 25.33 |
| 710 | 90.46 | 29.55 |
| 720 | 90.38 | 33.92 |
| 730 | 90.21 | 38.05 |
| 740 | 90.21 | 41.89 |
| 750 | 90.04 | 45.03 |
| 760 | 90.00 | 47.41 |
| 770 | 89.85 | 48.93 |
| 780 | 89.77 | 50.01 |
| 790 | 89.69 | 50.55 |
| 800 | 89.60 | 51.02 |
| 850 | 89.14 | 51.70 |
| 900 | 88.72 | 53.05 |
| 950 | 88.43 | 54.53 |
| 1000 | 88.34 | 55.41 |
| 1050 | 88.19 | 56.01 |
| 1100 | 88.16 | 56.24 |
| 1150 | 88.05 | 55.47 |
| 1200 | 88.15 | 56.24 |
| 1250 | 88.20 | 56.94 |
| 1300 | 88.38 | 56.85 |
| 1350 | 88.53 | 55.73 |
| 1400 | 88.72 | 54.34 |
| 1450 | 89.08 | 54.96 |
| 1500 | 89.31 | 55.68 |
| 1550 | 89.58 | 55.73 |
| 1600 | 89.70 | 55.33 |
| 1650 | 89.96 | 43.10 |
| 1700 | 89.88 | 47.43 |
| 1750 | 89.85 | 49.68 |
| 1800 | 89.57 | 50.82 |
| 1850 | 89.51 | 52.00 |
| 1900 | 89.31 | 49.07 |
| 1950 | 89.32 | 49.94 |
| 2000 | 89.12 | 51.21 |
| 2050 | 89.04 | 49.83 |
| 2100 | 89.04 | 45.98 |
| 2150 | 89.00 | 39.13 |

In order to calculate a "transmitted color shift" defining the shift in color of the selected reference material (fabric) when viewed through the reference substrate (Starphire® glass), the following mathematical formula was developed:

$$T\lambda = SI\lambda \times TG\lambda \times RO\lambda \times TG\lambda \times SO\lambda$$

where $T\lambda$ is the amount of light from the reference illuminant transmitted through the substrate, reflected by the selected material, and retransmitted back through the substrate to the measuring device at a wavelength $\lambda$, $SI\lambda$ is the relative power of the reference illuminant at a wavelength $\lambda$ (from ASTM E 308-85), $TG\lambda$ is the transmittance of the substrate at a wavelength $\lambda$ (measured by the spectrophotometer), $RO\lambda$ is the reflectance of the selected material at a wavelength $\lambda$ (measured by the spectrophotometer), and $SO\lambda$ is a standard observer tristimulus value at a wavelength $\lambda$ (ASTM E 308-85, CIE 1964 Supplementary Standard (10 degrees) standard observer tristimulus value). The color of the material viewed through the substrate was then determined using ASTM E 308-85. Exemplary color calculation methods are described in *Principles of Color Technology*, by F. W. Billmeyer and M. Saltzman, second edition, 1981, published by John Wiley & Sons, herein incorporated by reference, and will be well understood by one of ordinary skill in the art.

After having defined the transmitted color shift for this standard system, similar calculations were made using specimens of different glass samples and the transmitted color shift again calculated as described above for these other glass specimens. The difference between the calculated color shift of the fabric material viewed through the Starphire® glass and the same fabric material viewed through the selected substrate under examination is referred to herein as the "standard transmitted color shift" (DC) and is defined as follows:

$$DC = [(a^*_{ref} - a^*_{test})^2 + (b^*_{ref} - b^*_{test})^2]^{1/2}$$

where $a^*_{ref}$ and $b^*_{ref}$ are the a* and b* values from the standard system, and $a^*_{test}$ and $b^*_{test}$ are the a* and b* values using the test specimen.

Tables 4–7 list the spectral property differences and the standard transmitted color shifts (DC) for several representative glass panels made from selected glass compositions of the invention listed in Table 1 (Samples 8, 9, 10 and 11) for several different colored commercially available fabrics compared to the above described "standard" Starphire® system. The "Delta" values are calculated by subtracting the test value from the standard system value for the particular property being reported.

TABLE 4

| Test Glass = | Sample 8 | Sample 8 | Sample 8 | Sample 8 | Sample 8 |
|---|---|---|---|---|---|
| Fabric = | GRAY RIBBED | BROWN RIBBED | BROWN | GRAY | BLUE RIBBED |
| DELTA L* | −8.8 | −8.0 | −7.5 | −7.3 | −5.5 |
| DELTA a* | −3.1 | −3.7 | −3.2 | −2.5 | −1.6 |
| DELTA b* | 1.1 | −0.6 | −0.4 | 1.1 | 2.2 |
| DC | 3.3 | 3.8 | 3.2 | 2.7 | 2.7 |

TABLE 5

| Test Glass = | Sample 9 | Sample 9 | Sample 9 | Sample 9 | Sample 9 |
|---|---|---|---|---|---|
| Fabric = | GRAY RIBBED | BROWN RIBBED | BROWN | GRAY | BLUE RIBBED |
| DELTA L* | −8.7 | −8.0 | −7.5 | −7.2 | −5.3 |
| DELTA a* | −4.8 | −5.2 | −4.6 | −3.9 | −2.7 |
| DELTA b* | 0.5 | −1.1 | −1.1 | 0.5 | 1.9 |
| DC | 4.8 | 5.3 | 4.7 | 3.6 | 3.3 |

TABLE 6

| Test Glass = | Sample 10 | Sample 10 | Sample 10 | Sample 10 | Sample 10 |
|---|---|---|---|---|---|
| Fabric = | GRAY RIBBED | BROWN RIBBED | BROWN | GRAY | BLUE RIBBED |
| DELTA L* | −9.1 | −8.4 | −7.8 | −7.5 | −5.6 |
| DELTA a* | −4.1 | −4.6 | −3.9 | −3.3 | −2.3 |
| DELTA b* | 1.5 | −0.3 | −0.4 | 1.3 | 2.5 |
| DC | 4.4 | 4.6 | 3.9 | 3.6 | 3.4 |

TABLE 7

| Test Glass = | Sample 11 | Sample 11 | Sample 11 | Sample 11 | Sample 11 |
|---|---|---|---|---|---|
| Fabric = | GRAY RIBBED | BROWN RIBBED | BROWN | GRAY | BLUE RIBBED |
| DELTA L* | −9.3 | −8.6 | −7.9 | −7.7 | −5.8 |
| DELTA a* | −3.9 | −4.4 | −3.8 | −3.1 | −2.1 |
| DELTA b* | 1.5 | −0.3 | −0.4 | 1.3 | 2.6 |
| DC | 4.1 | 4.4 | 3.8 | 3.4 | 3.4 |

For comparison purposes, Table 8 lists the standard transmitted color shift for the same fabric materials of Tables 4–7 but viewed through a conventional green glass, which in this case is Solargreen® glass, commercially available from PPG Industries, Inc., using the standard Starphire® glass system as described above as the reference.

COMPARATIVE TABLE 8

| | Comparative | | | | |
|---|---|---|---|---|---|
| Test Glass = | Solargreen | Solargreen | Solargreen | Solargreen | Solargreen |
| Fabric = | GRAY RIBBED | BROWN RIBBED | BROWN | GRAY | BLUE RIBBED |
| DELTA L* | −7.7 | −7.2 | −6.7 | −6.4 | −4.6 |
| DELTA a* | −7.6 | −7.6 | −6.8 | −6.4 | −4.9 |
| DELTA b* | 1.8 | 0.008 | −0.37 | 1.4 | 2.6 |
| DC | 7.9 | 7.6 | 6.8 | 6.5 | 5.6 |

As shown in Tables 4–8, the glass compositions of the invention provide generally lower standard transmitted color shifts than the Solargreen® glass. The glass of the invention preferably has a standard transmitted color shift as defined above of less than 6, preferably less than 5, more preferably less than 4, and most preferably less than 3, at a thickness of 3.9 mm.

The calculation method described above can be used to calculate the standard transmitted color shift for any glass substrate or fabric for which the respective spectral transmittance and reflectance are known.

However, as will be appreciated by one of ordinary skill in the art, the transmitted color shift can be directly measured, such as with a SpectraGard instrument commercially available from Byk Gardner. In this alternative method, a glass specimen, i.e., a reference, is placed in the reflection port of the instrument and the material, e.g., fabric, is placed about ¼ inch behind the specimen. The instrument is preferably operated in the specular reflection-excluded mode. A reference illuminant, e.g., D65, and a standard observer, e.g., 1964 (10°) observer, may be selected. In this configuration, light travels through the glass specimen, is reflected off the material, and passes through the specimen again to the instrument. Color values, e.g., chromaticity coordinates such as L*, a*, b*, etc., are then determined by the instrument.

After these "standard" values are obtained, the reference glass specimen can be replaced with a test specimen and the color values again measured. The instrument then determines the measured color difference between "standard" and the "test specimen" to generate a standard transmitted color shift.

However, a disadvantage of this alternative method is that actual samples, i.e., reference glass specimen, test specimen, and fabric, must be on hand to measure the transmitted color shift. Alternatively, in the spectrophotometric calculation method described above, once the spectral data for a particular glass specimen or fabric is measured, the transmitted color shift with respect to any other glass specimen can be calculated using the spectral data for the other glass specimen without having all of the samples physically present.

It will be readily appreciated by one of ordinary skill in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A neutral gray colored glass composition for automotive vision panels having reduced transmitted color shift characteristics, the glass composition having a base portion comprising:

| | | |
|---|---|---|
| $SiO_2$ | 65 to 75 | weight percent |
| $Na_2O$ | 10 to 20 | weight percent |
| CaO | 5 to 15 | weight percent |
| MgO | 0 to 5 | weight percent |
| $Al_2O_3$ | 0 to 5 | weight percent |
| $K_2O$ | 0 to 5 | weight percent | and major colorants comprising:

| | | |
|---|---|---|
| $Fe_2O_3$ (total iron) | 0.30 to 0.75 | weight percent |
| CoO | 0 to 15 | ppm |
| Se | 1 to 15 | ppm | wherein the glass has a luminous transmittance of at least 65 percent at a thickness of 3.9 mm, a redox ratio of equal to or greater than 0.4, a TSET of less than or equal to 65 percent, a dominant wavelength ranging from 480 nm to 560 nm and a standard transmitted color shift of less than 6.

2. The glass composition according to claim 1, wherein the glass composition is essentially free of nickel.

3. The glass composition according to claim 1, wherein the glass composition includes one or more additional components selected from chromium oxide, manganese oxide, titanium oxide, cerium oxide, zinc oxide, molybdenum oxide, or iron polysulfide.

4. The glass composition according to claim 1, wherein the total iron is greater than 0.5 weight percent up to 0.07 weight percent.

5. The glass composition according to claim 1, wherein the CoO is less than 12 ppm.

6. The glass composition according to claim 1, wherein the Se is less than 8 ppm.

7. The glass composition according to claim 1, wherein the standard transmitted color shift is less than or equal to 4.

8. The glass composition according to claim 1, wherein the TSET is less than or equal to 60 percent.

9. The glass composition according to claim 1, wherein the excitation purity is less than 8 percent.

10. The glass composition according to claim 1, wherein the excitation purity is less than 3 percent.

11. The glass composition according to claim 1, further including additional ultraviolet absorbing material.

12. The glass composition according to claim 11, wherein the additional ultraviolet absorbing material is an oxide of a material selected from the group cerium, zinc, tin, vanadium, titanium, molybdenum or combinations thereof.

13. The glass composition according to claim 11, wherein the additional ultraviolet material is less than or equal to 3 weight percent of the glass composition.

14. The glass composition according to claim 1, wherein the total iron is greater than 0.5 and up to 0.72 weight percent, the CoO is less than 9 ppm, and the Se is 1 to 6 ppm.

15. The glass composition according to claim 1, wherein the total iron is 0.3 to 0.5 weight percent.

16. The glass composition according to claim 15, wherein the redox ratio is 0.4 to 0.675.

17. The glass composition according to claim 15, wherein the Se is 3 to 6 ppm.

18. The glass composition according to claim 15, wherein the total iron is 0.3 to 0.5 weight percent, the redox ratio is 0.4 to 0.675, the CoO is 0 ppm, and the Se is 4 to 5 ppm.

19. The glass composition according to claim 15, including up to 10 ppm of iron polysulfide.

20. A neutral gray colored glass composition having reduced transmitted color shift characteristics as an automotive vision panels, the glass composition having a base portion comprising:

| | | |
|---|---|---|
| $SiO_2$ | 65 to 75 | weight percent |
| $Na_2O$ | 10 to 20 | weight percent |
| CaO | 5 to 15 | weight percent |
| MgO | 0 to 5 | weight percent |
| $Al_2O_3$ | 0 to 5 | weight percent |
| $K_2O$ | 0 to 5 | weight percent | and major colorants comprising:

| | | |
|---|---|---|
| $Fe_2O_3$ (total iron) | 0.30 to 0.75 | weight percent |
| CoO | 0 to 15 | ppm |
| Se | 1 to 15 | ppm | and essentially free of at least one of lanthanum oxide and cerium oxide, wherein the glass has a luminous transmittance of at least 65 percent at a thickness of 3.9 mm, a redox ratio of equal to or greater than 0.4, a TSET of less than or equal to 65 percent, a dominant wavelength ranging from 480 nm to 560 nm and a standard transmitted color shift of less than 6.

21. A neutral gray colored glass composition having reduced transmitted color shift characteristics as an automotive vision panel, the glass composition having a base portion comprising:

| | | |
|---|---|---|
| SiO$_2$ | 65 to 75 | weight percent |
| Na$_2$O | 10 to 20 | weight percent |
| CaO | 5 to 15 | weight percent |
| MgO | 0 to 5 | weight percent |
| Al$_2$O$_3$ | 0 to 5 | weight percent |
| K$_2$O | 0 to 5 | weight percent | and major colorants comprising:

| | | |
|---|---|---|
| Fe$_2$O$_3$ (total iron) | 0.30 to 0.70 | weight percent |
| CoO | 0 to 15 | ppm |
| Se | 1 to 15 | ppm | wherein the glass has a luminous transmittance of at least 65 percent at a thickness of 3.9 mm, a redox ratio of equal or greater than 0.4, a TSET of less than or equal to 65 percent, a dominant wavelength ranging from 480 nm to 560 nm and a standard transmitted color shift of less than 6.

22. An automobile having an interior and at least one vision panel having reduced transmitted color shift characteristics, the vision panel formed from a glass composition having a base portion comprising:

| | | |
|---|---|---|
| SiO$_2$ | 65 to 75 | weight percent |
| Na$_2$O | 10 to 20 | weight percent |
| CaO | 5 to 15 | weight percent |
| MgO | 0 to 5 | weight percent |
| Al$_2$O$_3$ | 0 to 5 | weight percent |
| K$_2$O | 0 to 5 | weight percent | and major colorants comprising:

| | | |
|---|---|---|
| Fe$_2$O$_3$ (total iron) | 0.30 to 0.70 | weight percent |
| CoO | 0 to 15 | ppm |
| Se | 1 to 15 | ppm | wherein the glass has a luminous transmittance of at least 65 percent at a thickness of 3.9 mm, a redox ratio of equal to or greater than 0.4, a TSET of less than or equal to 65 percent, a dominant wavelength ranging from 480 nm to 560 nm and a standard color shift of less than 6.

23. A transparency made from the glass composition recited in claim 1.

24. The transparency of claim 23, wherein the transparency has a thickness of 1 mm to 20 mm.

25. The transparency of claim 24, including a solar control coating deposited over at least a portion of the transparency.

26. The transparency of claim 24, wherein the transparency is an automotive vision panel.

27. A neutral gray colored glass composition for automotive vision panels having reduced transmitted color shift characteristics, the glass composition having a base portion comprising:

| | | |
|---|---|---|
| SiO$_2$ | 65 to 75 | weight percent |
| Na$_2$O | 10 to 20 | weight percent |
| CaO | 5 to 15 | weight percent |
| MgO | 0 to 5 | weight percent |
| Al$_2$O$_3$ | 0 to 5 | weight percent |
| K$_2$O | 0 to 5 | weight percent | and major colorants comprising:

| | | |
|---|---|---|
| Fe$_2$O$_3$ (total iron) | 0.30 to 0.70 | weight percent |
| CoO | 0 to 15 | ppm |
| Se | 1 to 15 | ppm | wherein the glass has a luminous transmittance of at least 65 percent at a thickness of 3.9 mm, a redox ratio of equal to or greater than 0.4, a TSET of less than or equal to 65 percent, a dominant wavelength ranging from 480 nm to 560 nm and a standard transmitted color shift of less than 4.

28. A neutral gray colored glass composition for automotive vision panels having reduced transmitted color shift characteristics, the glass composition having a base portion comprising:

| | | |
|---|---|---|
| SiO2 | 65 to 75 | weight percent |
| Na$_2$O | 10 to 20 | weight percent |
| CaO | 5 to 15 | weight percent |
| MgO | 0 to 5 | weight percent |
| Al$_2$O$_3$ | 0 to 5 | weight percent |
| K$_2$O | 0 to 5 | weight percent | and major colorants consisting essentially of:

| | | |
|---|---|---|
| Fe$_2$O$_3$ (total iron) | 0.30 to 0.75 | weight percent |
| CoO | 0 to 15 | ppm |
| Se | 1 to 15 | ppm | wherein the glass has a luminous transmittance of at least 65 percent at a thickness of 3.9 mm, a redox ratio of equal to or greater than 0.4, a TSET of less than or equal to 65 percent, a dominant wavelength ranging from 480 nm to 560 nm and a standard transmitted color shift of less than 6.

* * * * *